US010953874B2

(12) United States Patent
Yokoi (10) Patent No.: US 10,953,874 B2
(45) Date of Patent: Mar. 23, 2021

(54) COLLISION DETECTION DEVICE (71) Applicant: DENSO CORPORATION, Kariya (JP)

(72) Inventor: Yusuke Yokoi, Kariya (JP)

(73) Assignee: DENSO CORPORATION, Kariya (JP)

( * ) Notice: Subject to any disclaimer, the term of this patent is extended or adjusted under 35 U.S.C. 154(b) by 163 days.

(21) Appl. No.: 16/223,691

(22) Filed: Dec. 18, 2018

(65) Prior Publication Data

US 2020/0023837 A1  Jan. 23, 2020

(30) Foreign Application Priority Data

Dec. 22, 2017 (JP) .............................. JP2017-246648

(51) Int. Cl.
*B60W 30/095* (2012.01)
*G08G 1/16* (2006.01)

(52) U.S. Cl.
CPC ..... *B60W 30/0953* (2013.01); *B60W 2400/00* (2013.01); *B60W 2554/00* (2020.02); *G08G 1/166* (2013.01)

(58) Field of Classification Search
CPC ......... B60W 30/0953; B60W 30/0956; B60W 2554/00; B60W 2554/20; B60W 2554/4029; B60W 2400/00; G08G 1/166
See application file for complete search history.

(56) References Cited

U.S. PATENT DOCUMENTS

| 10,351,128 | B2* | 7/2019 | Sung ....................... G08G 1/165 |
| 2009/0303026 | A1* | 12/2009 | Broggi ............... G06K 9/00805 340/435 |
| 2014/0324330 | A1 | 10/2014 | Minemura et al. | |
| 2016/0090085 | A1* | 3/2016 | Ike ........................ B60W 10/18 701/36 |
| 2017/0039855 | A1* | 2/2017 | Maeda .................. B60W 30/09 |

FOREIGN PATENT DOCUMENTS

| JP | 2005-280538 A | 10/2005 |
| JP | 2012-247829 A | 12/2012 |
| JP | 2014-109943 A | 6/2014 |
| JP | 2014-109944 A | 6/2014 |
| JP | 2014-213776 A | 11/2014 |
| JP | 2017-167608 A | 9/2017 |

* cited by examiner

*Primary Examiner* — Michael J Zanelli
(74) *Attorney, Agent, or Firm* — Maschoff Brennan (57) ABSTRACT

A collision detection device detects a probability of whether a vehicle will collide with a detected moving object. An ECU determines a high-risk region measured by a predetermined distance in a forward moving direction of the vehicle from a farthest feature point obtained from a farthest-located obstacle object detected on a road's shoulder. When the moving object is detected in the high-risk region, the ECU reduces a collision detection time-period within which the vehicle must detect whether the vehicle would collide with the moving object. The reduced collision detection time-period is shorter than a collision detection time-period to be used when the moving object is detected outside of the high-risk region.

16 Claims, 8 Drawing Sheets

COLLISION DETECTION DEVICE

CROSS-REFERENCE TO RELATED APPLICATION

This application is related to and claims priority from Japanese Patent Application No. 2017-246648 filed on Dec. 22, 2017, the contents of which are hereby incorporated by reference.

TECHNICAL FIELD

The disclosure relates to collision detection devices capable of detecting whether an own vehicle equipped with a collision detection device will collide with a moving object detected by an object detection sensor.

BACKGROUND

A collision detection device mounted on a vehicle detects a probability of whether the vehicle will collide with a detected object, detected by an object detection sensor mounted on the vehicle, within a predetermined collision detection time period. The predetermined collision detection time period is a time period necessary to perform the collision detection. The collision detection device determines a high-risk region around an obstacle object such as a stopped vehicle, etc. on a shoulder of the road on which the own vehicle drives. When detecting a moving object within the high-risk region, the collision detection device determines whether the own vehicle will collide with the detected moving object within the predetermined collision detection time period. This predetermined collision detection time period is shorter in time than a collision detection time period necessary when the moving object is outside of the high-risk region.

When detecting stopped vehicles located in a forward moving direction of the own vehicle on the road, the collision detection device determines, as the high-risk region, behind the stopped vehicle when viewing in the forward moving direction of the own vehicle. Accordingly, when there are two stopped vehicles (as obstacle objects which become obstacles to correctly detecting a moving object) on a shoulder of the road, which are located in the forward moving direction of the own vehicle, the collision detection device reduces the high-risk region of the stopped vehicle separated from the location of the own vehicle by more than the high-risk region of the other stopped vehicle close to the own vehicle. As a result, when a pedestrian as a moving object is rushing out, from the shoulder of the road behind the stopped vehicle away from the own vehicle, crossing the road in front of the stopped vehicle, the collision detection device cannot reduce the collision detection time period because the pedestrian is present outside of the high-risk region.

In order to avoid this, when extending the high-risk region toward behind the stopped vehicle, the collision detection device detects a pedestrian, who is visually and easily recognized by the driver of the own vehicle in the extended high-risk region. This case provides an unnecessarily-reduced collision detection time period.

SUMMARY

It is therefore desired to provide a collision detection device capable of determining a most suitable collision detection time period in accordance with various situations.

An exemplary embodiment provides a collision detection device capable of detecting a probability of whether an own vehicle will collide with a moving object detected by a detection sensor mounted on the own vehicle. The collision detection device has a computer system including a central processing unit. The computer system provides an area determination part and a collision detection part. The area determination part determines a high-risk region measured by a predetermined distance in a forward moving direction of the own vehicle from a farthest feature point in feature points of a farthest-located obstacle object in a plurality of obstacle objects detected on a shoulder of a road on which the own vehicle drives. The farthest-located obstacle object separated from a position of the own vehicle is located in the forward moving direction of the own vehicle. The collision detection part reduces a collision detection time period to be used until a finish detecting whether the own vehicle would collide with a moving object when the moving object is detected in the high-risk region. The reduced collision detection time period is shorter than a collision detection time period to be used when the moving object is detected outside of the high-risk region.

In the collision detection device according to a disclosure, the area determination part determines a high-risk region on the basis of a farthest feature point of the detected obstacle object located at the farthest position in the image data acquired by and transferred from the object detection sensor. The high-risk region is separated from the farthest feature point by the predetermined distance in the forward moving direction of the own vehicle. The farthest feature point is a feature point obtained from the farthest-located obstacle object in a plurality of obstacle objects detected on a shoulder of the road on which the own vehicle drives. Because the high-risk region is determined on the basis of the farthest feature point of the detected obstacle object located at the farthest location in the acquired image data, it is possible to detect the high-risk region having a necessary size in spite of the number of detected obstacle objects. As a result, this makes it possible to detect a moving object behind the detected obstacle object, which needs to be notified to the driver of the own vehicle, in the high-risk region, and to detect a moving object, not behind the detected obstacle object which does not need to be notified to the driver of the own vehicle, in an area which is outside of the high-risk region. It is accordingly possible to suppress the collision detection time period in spite of detecting a moving object which is not a high priority, i.e., which does not need to be notified to the driver of the own vehicle.

BRIEF DESCRIPTION OF THE DRAWINGS

A preferred, non-limiting embodiment of the disclosure will be described by way of example with reference to the accompanying drawings, in which.

DETAILED DESCRIPTION OF THE PREFERRED EMBODIMENTS

Hereinafter, various embodiments of the disclosure will be described with reference to the accompanying drawings. In the following description of the various embodiments, like reference characters or numerals designate like or equivalent component parts throughout the several diagrams.

Exemplary Embodiment

A description will be given of a collision detection device 1 according to an exemplary embodiment and modifications thereof with reference to FIG. 1 to FIG. 8.

Figure 1:
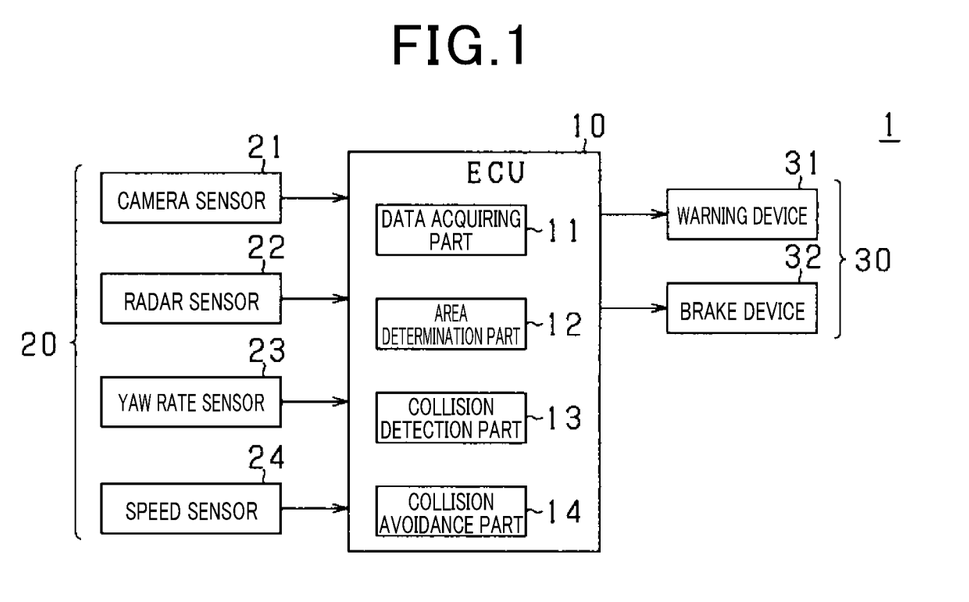
FIG. 1 is a block diagram showing an advanced cruise assist system as a collision detection device according to an exemplary embodiment of the disclosure.

FIG. 1 is a block diagram showing an advanced cruise assist system as the collision detection device 1 according to the exemplary embodiment of the disclosure. As shown in FIG. 1, the collision detection device as the collision detection device 1 has an electronic control unit (ECU) 10, a plurality of sensors 20, and control-target devices 30. The control-target devices 30 are composed of a warning device 31 and a brake device 32, etc. The advanced cruise assist system as the collision detection device 1 is a pre-crash safety system to be mounted on a motor vehicle, for example.

The ECU 10 has a data acquiring part 11, an area determination part 12, a collision detection part 13, a collision avoidance part 14. The ECU 10 is an electronic control unit having a computer system including a central processing unit (CPU), a read only memory (ROM), a random access memory (RAM), an interface, etc. The ECU 10 executes programs which have been stored in the ROM so as to realize the data acquiring part 11, the area determination part 12, the collision detection part 13 and the collision avoidance part 14. That is, the ECU 10 corresponds to the collision detection device 1 according to the exemplary embodiment capable of receiving detection signals transmitted from various sensors so as to realize the data acquiring part 11, the area determination part 12, the collision detection part 13 and the collision avoidance part 14.

The data acquiring part 11 acquires detection signals transmitted from the various sensors, mounted on a motor vehicle (hereinafter, will be referred to as the own vehicle 41 (see FIG. 2), such as a camera sensor 21, a radar sensor 22, a yaw rate sensor 23, a speed sensor 24, etc. The camera sensor 21 and the radar sensor 22 correspond to object detection sensors.

The camera sensor 21 is a stereo camera configured to acquire an image of in front of the own vehicle 41, and to detect a distance between the own vehicle 41 and one or more moving objects. For example, there are, as such moving objects, a pedestrian, a motor vehicle, etc. which are present in front of the own vehicle 41. The collision detection device 1 according to the exemplary embodiment, i.e. the ECU 10 recognizes a pedestrian, a road obstacle, a vehicle on a road on the basis of acquired image.

The radar sensor 22 detects a moving object and a position thereof. This location of the moving object corresponds to a relative position between the moving object and the own vehicle 41. The yaw rate sensor 23 is a known sensor configured to detect a turning angular velocity of the own vehicle 41.

The speed sensor 24 detects a rotation speed of the wheels of the own vehicle 41, i.e. detects a moving velocity of the own vehicle 41

The ECU 10 receives the detection results as the detection signals transmitted from the sensors composed of the camera sensor 21, the radar sensor 22, the yaw rate sensor 23, the speed sensor 24, etc. In particular, the camera sensor 21 detects a moving object which is located in the forward moving direction, i.e. in the moving direction of the own vehicle 41 every predetermined time period (for example, every 100 ms). The radar sensor 22 transmits directional electromagnetic waves toward the moving object located in front of the own vehicle 41. The radar sensor 22 receives reflection waves reflected by the moving object in order to detect a shape and a size of the moving object.

The area determination part 12 recognizes the position or location of an obstacle object on the basis of the received detection signals transmitted from the camera sensor 21 and the radar sensor 22. The area determination part 12 further determines a high-risk region on the basis of the position of the recognized obstacle object. For example, there are objects, as obstacle object, located at a shoulder of the road on which the own vehicle 41 drives. Specifically, there are, as the obstacle object, vehicles stopped on a shoulder, road signs, signboards, etc.

It is preferable for the area determination part 12 to determine the high-risk region which is located behind the obstacle object when viewing in a forward moving direction of the own vehicle, which is separated from the moving direction of the own vehicle 41. That is, it is difficult for the camera sensor 21, the radar sensor 22, and the driver of the own vehicle 41 to correctly detect a moving object such as a pedestrian which is present behind the obstacle object, compared with the situation where a moving object located on a road which is not behind the obstacle object. It is acceptable for the area determination part 12 to contain, as the high-risk region, a rear side area of the obstacle object, and a side area of the obstacle object.

The area determination part 12 determines a high-risk region having a predetermined depth toward the positive direction of the x axis, i.e. toward the forward moving direction of the own vehicle 41, measured from the farthest feature point in feature points of an obstacle object in the acquired image, which is separated from the position of the own vehicle, i.e. the farthest-located obstacle object located at the farthest position in detected obstacle objects in the acquired image transmitted from the camera sensor 21 and/or the radar sensor 22.

A description will now be given of a concrete example for the area determination part 12 in the ECU 10 to determine high-risk regions with reference to FIG. 2.

Figure 2:
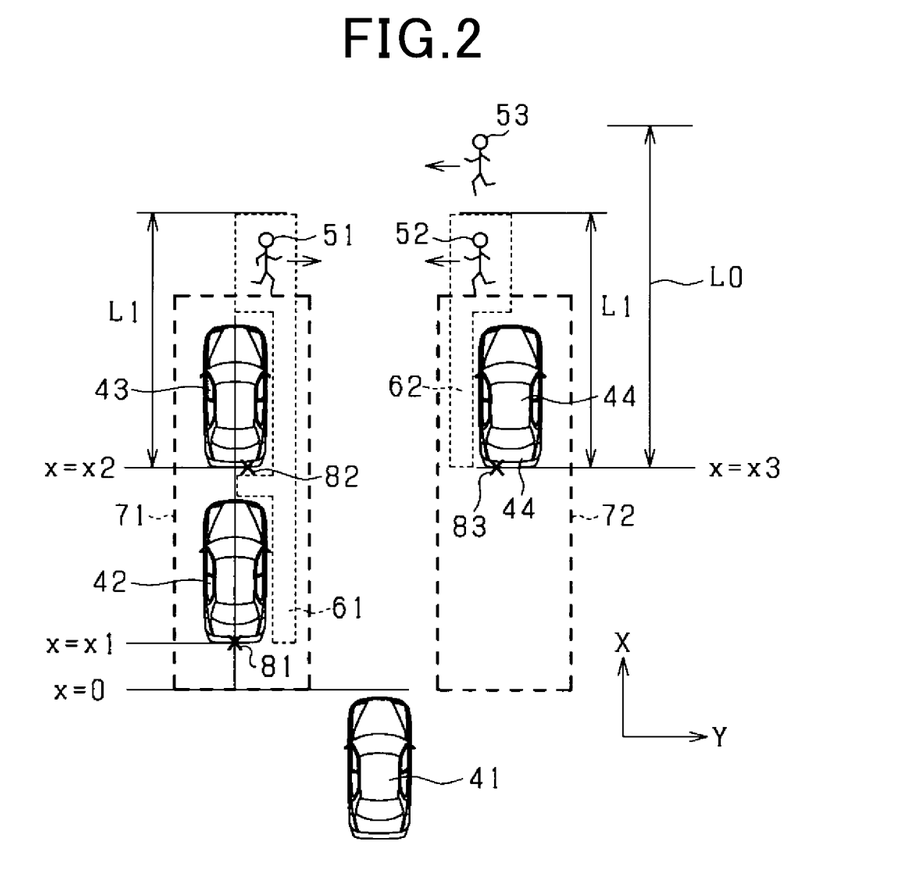
FIG. 2 is a bird's eye view showing high-risk regions determined by the collision detection device according to the exemplary embodiment of the disclosure.

FIG. 2 is a bird's eye view showing a high-risk region 61 located at the left-hand shoulder of the road and a high-risk region 62 located at the right-hand shoulder of the road determined by the area determination part 12 in the ECU 10 as the collision detection device 1 according to the exemplary embodiment.

As shown in FIG. 2, when detecting a plurality of obstacle objects, which correspond to the vehicles 42 and 43 stopped at the left-hand side shoulder in the negative direction of the y axis of the road, i.e. in the forward moving direction of the own vehicle 41 (i.e. in the positive direction of the x axis), the area determination part 12 determines a side part of the high-risk region 61 which is separated from the feature point 82 (x=x2 shown in FIG. 2) by a longitudinal distance L1 in the positive direction of the x axis. The feature point 82 is a feature point of the farthest-located vehicle 43 located at the farthest position in the acquired image.

The area determination part 12 adjusts the longitudinal distance L1 so as for the high-risk region 61 to contain a forward area behind the farthest-located stopped vehicle 43 as the obstacle object located at the farthest position in the positive direction of the x axis when viewed from the own vehicle 41 side.

As shown in FIG. 2, the area determination part 12 determines the rear side part of the high-risk region 61 in the direction of the x axis. The rear side part of the high-risk region 61 corresponds to a feature point 81 (x=x1) of another stopped vehicle 42 as the obstacle object which is closest to the location of the own vehicle 41.

The area determination part 12 determines a y-direction range of the high-risk region 61 which is measured from the right-hand side (the road side) of each of the stopped vehicles 42 and 43 (as the detected obstacle objects) in the direction of the y axis by a predetermined distance.

It is acceptable to use, as the position of the right-hand side of each of the stopped vehicles 42 and 43, a specific feature point of the stopped vehicles 42 and 43 which is located at a most right-hand side on the left-hand side shoulder. As previously described, because the area determination part 12 determines the high-risk region 61 on the basis of the farthest feature point 82 of the stopped vehicle 43 located at the farthest position and is furthest from the own vehicle 41 relative to the other stopped vehicle 42 which is closest to the own vehicle 41, it is possible to detect a moving object 51 (as a pedestrian) within the high-risk region 61, the moving object being behind the stopped vehicle 43 located at the farthest position (or the farthest-located vehicle in the acquired image), and the detected moving object 51 is crossing the road from the left-hand side shoulder toward the positive direction of the y axis.

In the following description, the rear side part (x=x1 shown in FIG. 2) of the high-risk region 61 will be also referred to as the "start point", and the far-end part of the high-risk region 61 will be referred to as the "end point".

On the other hand, when detecting the vehicle 44 (see the right-hand side in FIG. 2) as another obstacle object which has stopped at a right-hand side shoulder of the road in the positive direction of the y axis, the area determination part 12 determines the far boundary of the high-risk region 62, which is separated from the feature point 83 (which is at x=x3) of the stopped vehicle 44 by a longitudinal distance L1 (see the right-hand side of FIG. 2).

The start point at the rear side part of the high-risk region 62, which is close to the location of the own vehicle 41, corresponds to the feature point 83 of the vehicle 44.

The area determination part 12 determines a y-direction range of the high-risk region 62 in the direction of the y axis within a predetermined distance measured from the end side at the left-hand side of the vehicle 44 in the direction of the y axis.

Because the area determination part 12 determines the high-risk region 62 on the basis of the feature point 83 of the vehicle 44, it is possible to detect a moving object 52 (as a pedestrian) within the high-risk region 62 moving from the area behind the vehicle 44 toward the left-hand side (in the negative direction of the y axis). Still further, it is possible for the area determination part 12 to detect another moving object 53 (as a pedestrian) outside the high-risk region 63 and away from the moving object 52 in the positive direction of the x axis. Because the moving object 53 will separated from the stopped vehicle 44 as the obstacle object, it is possible for the area determination part 12 in the ECU 10 to detect the moving object 53 which is not behind the vehicle 44. That is, it is not necessary for the area determination part 12 to detect the moving object 53 within the high-risk region 52 because of detecting the moving object 53 which is not behind the stopped vehicle 44.

On the other hand, a conventional technique determines a high-risk region on the basis of the feature point 81 of the vehicle 42 stopped at the closest location to the own vehicle 41, and an end point of the high-risk region which is furthest from the feature point 81 of the stopped vehicle 42 by the predetermined distance L0. Further, the conventional technique adjusts the predetermined distance L0 so as for the high-risk region to contain the moving object (as a pedestrian shown in FIG. 2) which is behind another stopped vehicle 43. In this case, when the conventional technique determines another high-risk region on the right-hand side shoulder of the road on the basis of the feature point 83 of the stopped vehicle 42 by using the adjusted predetermined distance L0, the conventional technique detects the moving object 53 (another pedestrian) in the high-risk region, which is not behind the stopped vehicle 44.

Returning to the collision detection device 1 as the ECU 10 according to the exemplary embodiment, as previously described and shown in FIG. 2, the area determination part 12 determines the high-risk region 61 having the distance L1 measured from the farthest feature point 82 of the farthest-located stopped vehicle 43 (located furthest from the own vehicle 41) as the obstacle object detected at the left-hand side shoulder of the road in the forward moving direction (i.e. the positive direction of the x axis) of the own vehicle 41. Further, as shown in FIG. 2, the area determination part 12 further determines the high-risk region 62 having the distance L1 measured from the farthest feature point 83 of the stopped vehicle 43 (located furthest from the own vehicle 41) as the obstacle object detected at the right-hand side shoulder of the road in the forward moving direction (i.e. the positive direction of the x axis) of the own vehicle 41. Accordingly, it is possible for the area determination part 12 in the ECU 10 to determine the high-risk regions 61 and 62 regardless of the number of detected obstacle objects such as stopped vehicles. This makes it possible to detect the moving object 51 in the high-risk region 61 and the moving object 52 in the high-risk region 62 although the moving objects 15 and 52 are detected as pedestrians because of being behind the stopped vehicles. Further, this makes it possible to detect the moving object 53, which is not a high priority, i.e. which is not to be notified to the driver of the own vehicle because of being present outside of the high-risk regions 61 and 62.

The collision avoidance part 14 detects a probability of whether the own vehicle will collide with the detected moving object on the basis of comparison results of whether position parameters satisfy predetermined collision detection conditions. There are, as these position parameters, a relative speed and a relative distance between the own vehicle 41 and a moving object, and a moved amount in a right-hand direction and a left-hand direction, which is perpendicular to the moving direction of the own vehicle 41, where the moving object has been detected by the camera sensor 21 or the radar sensor 22.

For example, when the detected moving object is crossing the road in front of the own vehicle 41, the collision detection part 13 detects a probability of whether the own vehicle 41 will collide with the detected moving object.

When detecting that the moving object detected by the camera sensor 21 or the radar sensor 22 is present within the high-risk region, the collision detection part 13 further determine whether the own vehicle 41 will collide with the moving object within a collision detection time period which is shorter than a usual collision detection time period. This usual collision detection time period is used for the moving object which is present outside of the high-risk region. This collision detection time period indicates a time period which is necessary to correctly determine whether the own vehicle 41 will collide with the moving object. As shown in FIG. 2, for example, because the moving objects 51 and 52 are detected within the respective high-risk regions 61 and 62, the collision detection part 13 determines that the collision detection time period should be shorter than the usual collision detection time period.

Specifically, the collision detection part 13 reduces the collision detection time period by relaxing the predetermined collision detection conditions which are necessary to correctly perform the collision detection.

There are, as the predetermined collision detection conditions, the number of pixels (or the number of frames) to be used to detect a trace of the moving object, a moving distance of the moving object in a lateral direction (i.e. the direction of the y axis shown in FIG. 2), etc.

The relaxation of the predetermined collision detection conditions indicates reduction of the number of pixels (or frames) or reduction of the moving distance of the moving object. This relaxation of the predetermined collision detection conditions provides a quick detection of whether the own vehicle will collide with the moving object.

When adjusting the predetermined collision detection conditions so as to reduce the collision detection time period, the collision detection part 13 relaxes the predetermined collision detection conditions more according to reducing the moving distance of the moving object in the lateral direction. For example, in the moving distance of the own vehicle 41 in the direction of the y axis (or the y-axis direction) shown in FIG. 2, the y-axis direction distance measured from the own vehicle 41 to the vehicle 44 which has stopped at the right-hand side of the own vehicle 41 is shorter than the y-axis direction distance between the own vehicle 41 and the vehicles 42 and 43 which have stopped at the left-hand side of the own vehicle 41. In this case, the collision detection part 13 relaxes the predetermined collision detection conditions so as to reduce the collision detection time period, to be used for detecting the moving object 52 behind the stopped vehicle 44, by more than the collision detection time period to be used for detecting the moving object 51 behind the stopped vehicles 42 and 43.

The collision avoidance part 14 controls the operation of the control-target devices 30 such as the warning device 31 and the brake device 32, etc. shown in FIG. 1 on the basis of the results of the collision detection transmitted from the collision detection part 13. This control makes it possible to suppress a collision of the own vehicle 41 with the detected moving objects so as to reduce collision damage. In addition to the warning device 31 and the brake device 32 shown in FIG. 1, it is preferable to add, as the control-target devices 30, an actuator capable of driving a steering assembly and seat belts.

For example, when detecting a dangerous situation having a risk of collision with a pedestrian, a bicycle, etc., the collision avoidance part 14 provides a warning to the driver of the own vehicle 41, the pedestrian and a driver of the bicycle by using the warning device 31. Further, the collision avoidance part 14 drives the brake device 32 so as to reduce the moving speed of the own vehicle 41 or to stop the own vehicle 41 moving. As previously described, the collision avoidance part 14 avoids collision between the own vehicle 41 and the detected moving objects.

A description will be given of the collision avoidance process performed by the ECU 10 as the collision detection device 1 according to the exemplary embodiment with reference to FIG. 3, FIG. 4 and FIG. 5.

Figure 3:
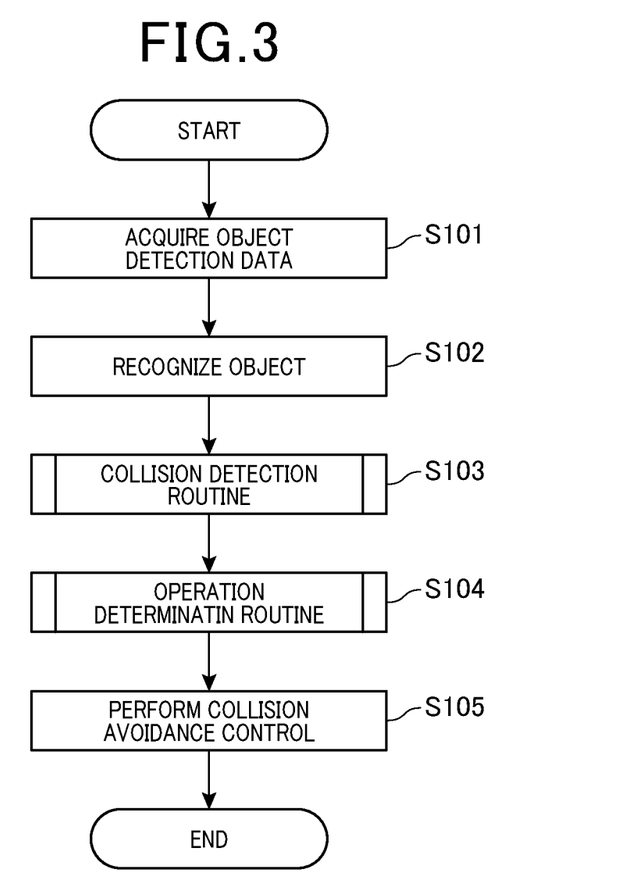
FIG. 3 is a view showing a flow chart of a collision avoidance process performed by an electric control unit (ECU) as the collision detection device according to the exemplary embodiment of the disclosure.

FIG. 3 is a view showing a flow chart of the collision avoidance process performed by the ECU 10 as the collision detection device 1 according to the exemplary embodiment. FIG. 4 is a view showing a flow chart of a collision detection routine in the collision avoidance process shown in FIG. 3.

The ECU 10 periodically executes the collision avoidance process shown in FIG. 3 every predetermined period (for example, approximately 50 ns).

As shown in FIG. 3, in step 101, the ECU 10 receives object detection data transmitted from the camera sensor 21 and the radar sensor 22, etc. In more detail, the ECU 10, i.e. the data acquiring part 11 acquires position information of each of detected moving objects in step S101. The operation flow progresses to step S102.

In step S102, the ECU 10, i.e. the data acquiring part 11 performs a matching step of image data acquired by and transmitted from the camera sensor 21. The data acquiring part 11 obtains information of each moving object, for example, a type of each moving object (for example, a vehicle, a pedestrian, a bicycle, a motorbike, etc. on the basis of an outline of each moving object. The ECU 10, i.e. the data acquiring part 11 performs a pattern matching of the acquired information with object information which has been stored in the ROM or RAM (not shown) in the ECU 10, or obtained in the previously-performed matching process. The operation flow progresses to step S103.

In step S103, the ECU 10 performs the collision detection routine. FIG. 4 shows a detailed flow chart of the collision detection routine in step S103. In the collision detection routine, the ECU 10, i.e. the collision detection part 13 detects whether the detected moving object is crossing the road in front of the own vehicle 41.

Figure 4:
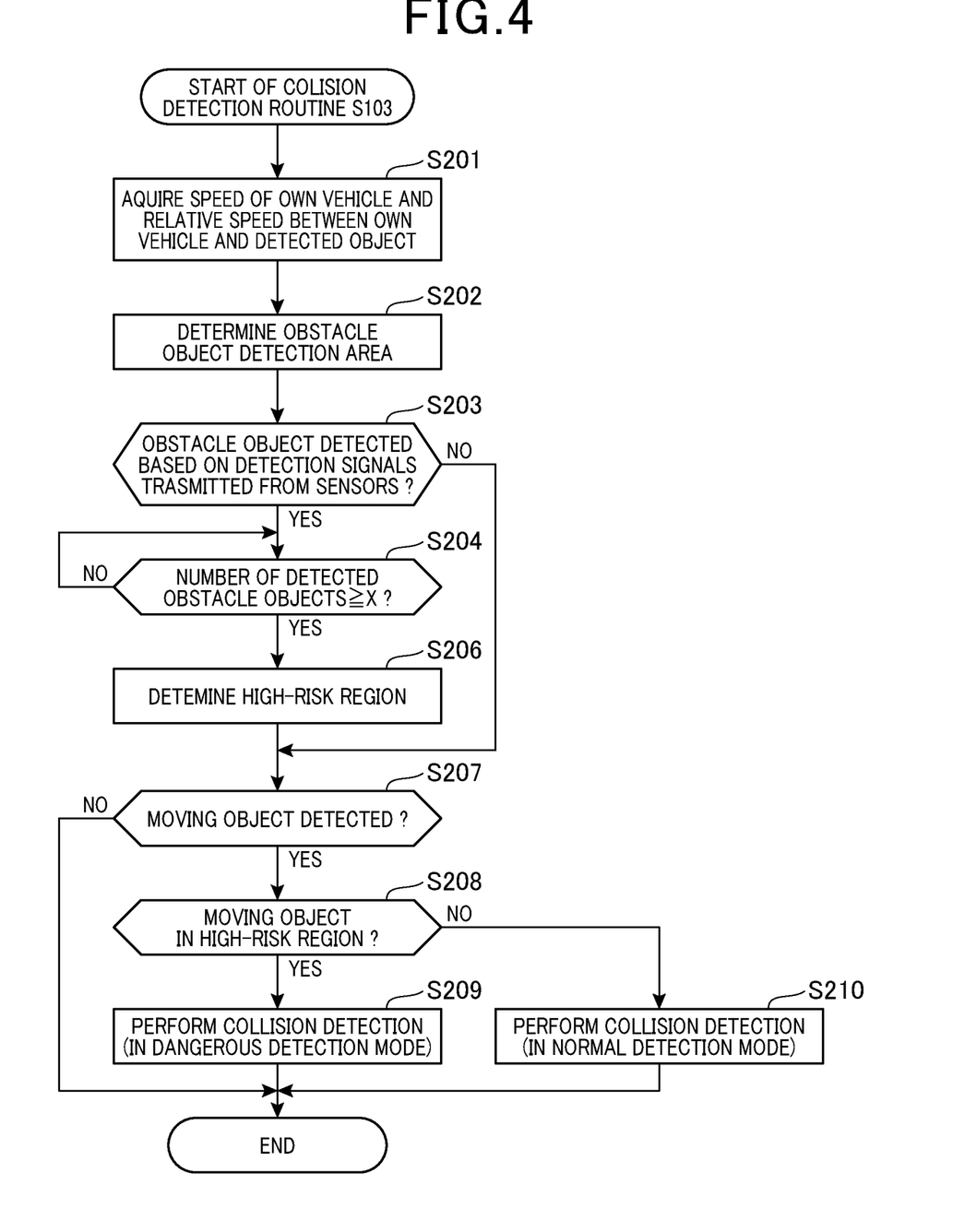
FIG. 4 is a view showing a flow chart of a collision detection routine in the collision avoidance process shown in FIG. 3.

In the collision detection routine shown in FIG. 4, the ECU 10, i.e. the data acquiring part 11 acquires a moving speed of the own vehicle 41 (S201). It is possible for the data acquiring part 11 to obtain a relative speed of the own vehicle 41 and the moving object on the basis of the moving speed of the own vehicle 41 and position history data of the moving object detected by the radar sensor 22. The position history data represent a relative movement track of the moving object to the position of the own vehicle 41. The operation flow progresses to step S202.

In step S202, the ECU 10, i.e. the area determination part 12 determines obstacle object detection areas at both sides of the own vehicle 41 on the road on which the own vehicle 41 drives. For example, as shown in FIG. 2, in the forward moving direction (i.e. the positive direction of the x axis) of the own vehicle 41 on the road, the area determination part 12 determines an obstacle object detection area 71 on the left-hand side shoulder and an obstacle object detection area 72 on the right-hand side shoulder of the road. Both the camera sensor 21 and the radar sensor 22 can detect objects such as stopped objects as the obstacle objects and moving objects in these obstacle object detection areas 71 and 72. The obstacle object detection area 71 on the left-hand side shoulder is separated from the obstacle object detection area 72 on the right-hand side shoulder. The ECU 10 can detect the presence of one or more moving objects on the detection results of the camera sensor 21 and the radar sensor 22.

It is possible for the ECU 10, i.e. the area determination part 12 to determine a position and a size of each of the obstacle object detection areas 71 and 72 on the basis of the moving speed of the own vehicle 41 or a relative speed between the own vehicle 41 and each of stopped vehicles 42 to 44 as the obstacle objects. For example, when the own vehicle 41 moves at a speed of 20 km/h or the relative speed is 20 km/h, the area determination part 12 determines each of the obstacle object detection areas 71 and 72 having a position within a range of 5 m to 15 m, and a depth of 10 m. Further, the area determination part 12 increases the position of each of the obstacle object detection areas 71 and 72 according to increasing of the moving speed of the own vehicle 41 or the relative speed, i.e. to be separated from the position of the own vehicle 41, and increases the size of each of the obstacle object detection areas 71 and 72. The operation flow progresses to step S203.

In step S203, the ECU 10, i.e. the area determination part 12 detects whether the stopped vehicle as the obstacle object has been detected in the obstacle object detection areas 71 and 72 the camera sensor 21 and the radar sensor 22. This stopped vehicle may be a completely stopped vehicle or a moving vehicle which moves at a low speed and can quickly stop moving.

When the detection result in step S203 indicates negative ("NO" in step S203), i.e. indicates that no obstacle object is detected in the obstacle object detection areas 71 and 72, the operation flow progresses to step S207.

On the other hand, when the detection result in step S203 indicates positive ("YES" in step S203), i.e. indicates that one or more obstacle objects are detected in the obstacle object detection areas 71 and 72, the operation flow progresses to step S204.

In step S204, the ECU 10 detects whether the number of the detected obstacle objects is not less than a predetermined number X. When the detection result in step S204 indicates positive ("YES" in step S204), i.e. indicates that the number of the detected obstacle objects is not less than the predetermined number X. The operation flow progresses to step S206.

On the other hand, when the detection result in step S204 indicates positive ("NO" in step S204), i.e. indicates that the number of the detected obstacle objects is less than the predetermined number X. The ECU 10 finishes the collision detection routine shown in FIG. 4.

In step S206, the area determination part 12 determines the high-risk region 61 at the left-hand side or the high-risk region 62 at the right-hand side of the own vehicle 41 in the forward moving direction of the own vehicle 41, i.e. in the positive direction of the x axis (see FIG. 2). The area determination part 12 determines the high-risk regions 61 and 62 so as for each of the high-risk regions 61 and 62 to contain an area behind the obstacle object (such as the stopped vehicle) in the forward moving direction of the own vehicle 41.

The area determination part 12 determines the high-risk region 61 so as for the start point of the high-risk region 61 to correspond to the feature point 81 of the stopped vehicle 42, and the end point of the high-risk region 61 is separated from the start point by the longitudinal distance L1 in the positive direction of the x axis as the forward moving direction of the own vehicle 41. As shown in FIG. 2, the feature point 82 corresponds to a rear side point of the stopped vehicle which is located at a deeper side in the obstacle object detection area 71.

The area determination part 12 determines the high-risk region 62 on the basis of, the feature point 83 as the start point, of the stopped vehicle 44. The area determination part 12 determines the end point of the high-risk region 62 which is separated in the forward moving direction of the own vehicle 41, i.e. the positive direction of the x axis from the start point (as the feature point 83) by the longitudinal distance L1. The feature point 83 corresponds to the farthest feature point of the obstacle object located at the farthest position in the obstacle object detection area 72.

It is acceptable to determine the longitudinal distance L1 based on the relative speed between the moving speed of the own vehicle 41 and the speed of the moving object. Similar to the longitudinal distance L1, it is also acceptable to increase the size of each of the high-risk regions 61 and 62 according to increasing of the relative speed between the own vehicle 41 and the moving object.

In step S203 to step S206 shown in FIG. 4, the area determination part 12 in the ECU 10 determines the high-risk region 61 at the left-hand side of the own vehicle 41 when the stopped vehicle is recognized in the left-hand side obstacle object detection area 71, and determines the high-risk region 62 at the right-hand side of the own vehicle 41 when the stopped vehicle is recognized in the right-hand side obstacle object detection area 72.

At least one or more of the recognized moving objects 51, 52 in the high-risk regions 61, 62 are present behind the stopped vehicles 42 and 44, or are crossing the road from the area behind the stopped vehicles 42 and 44.

The condition of each of the high-risk regions 61 and 62 which have been determined once is continued until the own vehicle 41 passes the side of the high-risk regions 61 and 62. When an object extracting distance is determined from the current position of the own vehicle 41 when the high-risk regions 61 and 62 are determined to the time when the own vehicle 41 passes at the side of the high-risk regions 61 and 62, the condition of each of the high-risk regions 61 and 62 is continued until the own vehicle 41 has moved the object extracting distance. The operation flow progresses to step S207.

In step S207 shown in FIG. 4, the ECU 10 detects whether a moving object is detected in the detection range of each of the camera sensor 21 and the radar sensor 22.

When the detection result in step S207 indicates negative ("NO" in step S207), i.e. no moving object is detected in the detection range of each of the camera sensor 21 and the radar sensor 22, the ECU 10 finishes the collision detection routine shown in FIG. 4 (i.e. shown in step S103 in FIG. 3). The operation flow progresses to step S104 shown in FIG. 3. The detection of a moving object is performed within the object detectable range by using the camera sensor 21 and the radar sensor 22.

On the other hand, when the detection result in step S207 indicates positive ("YES" in step S207), i.e. a moving object is detected in the detection range of each of the camera sensor 21 and the radar sensor 22, the operation flow progresses to step S208.

In step S208, the ECU 10 detects whether the moving object is detected in the high-risk regions 61, 62. When the detection result in step S208 indicates positive ("YES" in step S208), i.e. the moving object is detected in the high-risk region 61, 62, the operation flow progresses to step S209.

In step S209, the ECU 10 performs the collision detection step in a dangerous detection mode. That is, the ECU 10 reduces the collision detection time period, and performs the collision detection on the basis of the reduced collision detection time period.

In more detail, the ECU 10 relaxes the standard condition to be used for performing the collision detection so as to reduce the collision detection time period. For example, the ECU 10 reduces the total number of pixels to be used for obtaining a moving distance of the detected moving object. In more detail, the ECU 10 reduces the total number of frames, for example, changes from five frames to three frames, to be used for obtaining a moving distance of the detected moving object. For example, the ECU 10 reduces the lateral moving distance (which is approximately perpendicular to the forward moving direction of the own vehicle 41) of the detected moving object. In a concrete example, as shown in FIG. 2, it is preferable for the ECU 10 to more reduce the collision detection time period according to reduction of the distance in the direction of the y axis between the stopped vehicles 42 to 44 as the detected obstacle objects or according to reduction of the distance in the direction of the y axis between the detected moving object 51 and the detected moving object 52.

When the detection result in step S208 indicates negative ("NO" in step S208), i.e. no moving object is detected in the high-risk region 61, 62, the operation flow progresses to step S210.

In step S210, the collision detection part 13 as the ECU 10 performs the collision detection in a normal detection mode. In the normal detection mode, the collision detection part 13 as the ECU 10 performs the collision detection using the collision detection time period, instead of using the reduced collision detection time period.

In the collision detection step in step S209 and the collision detection step in step S210, the collision detection part 13 as the ECU 10 detects whether the detected moving object is crossing the road in front of the own vehicle 41 on the basis of the comparison result whether the parameter value satisfies the predetermined condition, where the parameter value indicates a relative speed between the own vehicle 41 and the detected moving object, a relative distance between the own vehicle 41 and the detected moving object, the lateral-direction moving distance of the detected moving object, etc.

After the collision detection step in step S209 or step S210, the ECU 10 finishes the collision detection routine shown in FIG. 4. The operation flow progresses to step S104 shown in FIG. 3.

The collision detection part 13 in the ECU 10 detects whether it is a timing to drive the control-target devices 30 such as the warning device 31 and the brake device 32 on the basis of a moving direction, a distance to the moving object from the own vehicle 41, a relative speed between the moving object and the own vehicle 41, etc. When it is the time to drive the control-target devices 30, the collision detection part 13 generates instructions and transmits the generated instruction to the control-target devices 30. The collision detection part 13 stores the generated instructions into the RAM (not shown) in the ECU 10.

Figure 5:
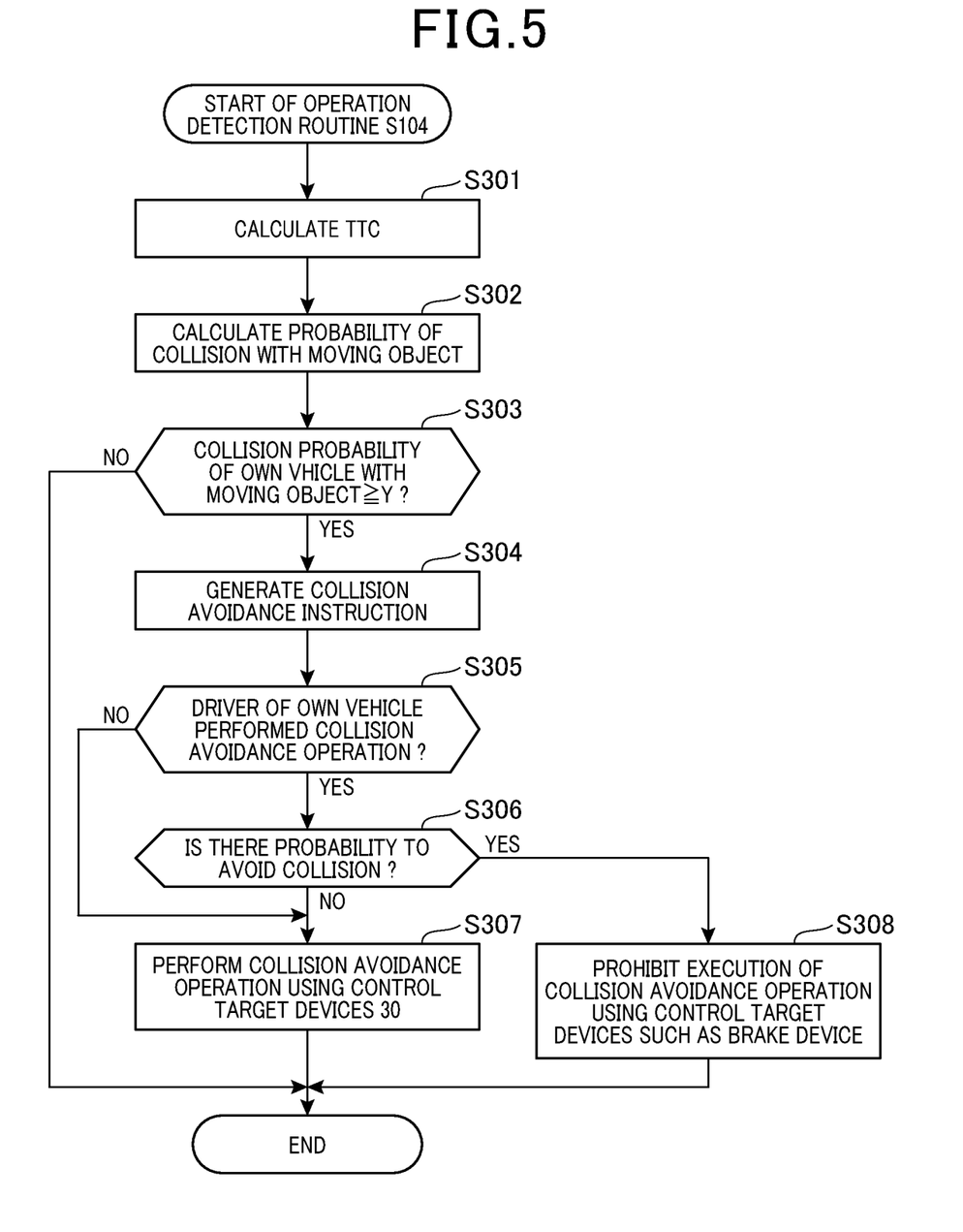
FIG. 5 is a view showing a flow chart of an operation determination routine in the collision avoidance process shown in FIG. 3.

FIG. 5 is a view showing a flow chart of an operation determination routine in the collision avoidance process shown in FIG. 3. As shown in FIG. 5, in step S301, the collision detection part 13 in the ECU 10 calculates a time to collision (TTC) which represents a time period until the own vehicle 41 will collide with the moving object on the basis of the behavior of the moving object and the relative speed between the moving object and the own vehicle 41. The operation flow progresses to step S302.

In step S302, the collision detection part 13 calculates a collision probability of whether the own vehicle 41 will collide with the moving object. That is, the collision detection part 13 calculates a plurality of correction coefficients on the basis of the results of the collision detection routine S103 shown in FIG. 3 (and shown in FIG. 4), the calculated TTC (Time to collision), the speed of the moving object, or the relative speed of the moving object and the own vehicle 41, and the position of the moving object, etc. The collision detection part 13 calculates the collision probability of whether the own vehicle 41 will collide with the detected moving object on the basis of the plurality of calculated correction coefficients. The operation flow progresses to step S303.

In step S303, the collision detection part 13 detects whether the calculated collision probability than the own vehicle 41 will collide with the detected moving object is not less than a threshold value Y.

When the detection result in step S303 indicates positive ("YES" in step S303), i.e. indicates that the calculated collision probability of the own vehicle 41 is not less than the threshold value Y, the operation flow progresses to step S304.

In step S304, the collision detection part 13 generates a collision avoidance instruction. For example, the collision detection part 13 sets an operation flag to a value of 1 in the RAM in order to drive the brake device 32. The operation flow progresses to step S305.

When the detection result in step S303 indicates negative ("NO" in step S303), i.e. indicates that the calculated collision probability of the own vehicle 41 is less than the threshold value Y, the ECU 10 finishes the operation determination routine shown in FIG. 5. The operation flow progresses to step S105 shown in FIG. 3.

In step S305 shown in FIG. 5, the collision detection part 13 in the ECU 10 determines whether it is necessary to drive the control-target devices 30. Specifically, when the driver of the own vehicle 41 has performed the collision avoidance operation (in step S305) after the collision avoidance instruction has been generated and stored in the RAM in step S304, and when there is an adequate time period until the own vehicle 41 will collide with the detected moving object, i.e. when there is a probability to avoid collision with the detected moving object (in step S306), the collision detection part 13 in the ECU 10 prohibits the brake device 32 from being driven (in step S308) because the driver of the own vehicle 41 has performed the collision avoidance operation.

That is, when detecting that it is possible to safely avoid the collision with the detected moving object, the collision detection part 13, i.e. the ECU 10 gives a high priority to the driver's collision avoidance operation, and prohibits the operation of the brake device 32.

When the collision avoidance operation is not performed, or when a decision indicates that it is impossible to avoid collision of the own vehicle 41 with a moving object after the execution of the collision avoidance operation, the operation flow progresses to step S307.

In step S307, the collision detection part 13 in the ECU 10 drives the control-target devices 30 and performs the collision avoidance operation.

The operation flow progresses to step S105 shown in FIG. 3 after step S307 or step S308 shown in FIG. 5.

In step S105, the ECU 10 performs a collision avoidance control step. The collision avoidance part 14 transmits the instructions of the brake device 32 on the basis of the operation flag stored in the RAM. This makes it possible to avoid the own vehicle 41 from colliding with the detected moving object such as a pedestrian, a motor vehicle, etc.

The collision detection device 1 as the ECU 10 according to the exemplary embodiment previously described has the following effects.

The area determination part 12 determines the high-risk regions 61 and 62 having the distance L1 measured from the farthest feature point of the farthest-located stopped vehicle (located furthest from the own vehicle 41) as the obstacle object detected at the shoulders of the road in the forward moving direction (i.e. the positive direction of the x axis) of the own vehicle 41. Because the high-risk regions are determined on the basis of the farthest feature point of the detected obstacle object, it is possible for the area determination part 12 to determine the high-risk region having a necessary size at an optimum position regardless of the number of the detected obstacle objects (for example, regardless of the number of stopped vehicles, one or more stopped vehicles). This makes it possible to correctly detect a moving object, (such as the moving objects 51, 52 shown in FIG. 2), which is being behind the detected obstacle object, within the determined high-risk region. This further makes it possible to suppress the collision detection time period from being reduced in spite of detecting the moving object 53 (see FIG. 2) which is not a high priority, i.e. which is not to be notified to the driver of the own vehicle.

The area determination part 12 determines the high-risk region when the number of detection signals representing the obstacle object is not less than a predetermined threshold value X, or determines the high-risk region when the ECU 10 receives obstacle-object detection signals detected by and transmitted from not less than two object detection sensors such as the camera sensor 21 and the radar sensor 22. This makes it possible to avoid incorrect detection of the obstacle object, and to eliminate determination of unnecessary high-risk region.

When it is detected that the moving object is behind the obstacle object, the ECU 10 reduces the collision detection time period to perform the collision detection of whether the own vehicle 41 will collide with the moving object. This makes it possible for the ECU 10 to quickly detect whether the own vehicle 41 will collide with the detected moving object.

On the other hand, when the moving object is not behind the obstacle object, it is possible for the ECU 10 to avoid incorrect detection whether the own vehicle 41 will collide with the moving object for a long period of time when compared with the detection time when the moving object is behind the obstacle object. It is accordingly possible for the ECU 10 to suppress occurrence of incorrect detection regarding the collision with the moving object.

Further, the ECU 10 determines the position or the size of each of the obstacle object detection areas 71, 72 on the basis of the moving speed of the own vehicle 41 or the relative speed between the detected obstacle object and the own vehicle 41. This makes it possible to set the position or the size of each of the obstacle object detection areas 71, 72 while considering that the area to be noticed varies according to the moving speed of the own vehicle 41 or the relative speed between the detected obstacle object and the own vehicle 41. This improves safety of the own vehicle 41.

The ECU 10 determines the high-risk regions 61, 62 on the basis of the moving speed of the own vehicle 41 or the relative speed between the detected moving object and the own vehicle 41. This makes it possible to set the position or the size of each of the high-risk regions 61, 62 while considering that the area to be analyzed and processed varies according to the moving speed of the own vehicle 41 or the relative speed between the detected moving object and the own vehicle 41. This further improves safety of the own vehicle 41.

As previously described, the collision detection device 1 as the ECU 10 according to the exemplary embodiment does not specify the range of the image processing of the image data acquired by the camera sensor 21 or does not specify the scanning range of the radar sensor 22. It is possible for the collision detection device 1 as the ECU 10 to determine the range of the image processing of the image data and the scanning range of the radar sensor 22 according to demands. For example, it is acceptable to specify the obstacle object detection area or the high-risk region as a moving object extraction area from which one or more moving objects are extracted. It is further acceptable to determine a moving object detection area which is narrower than the detectable range of the object detection sensor such as the camera sensor and the radar sensor. This makes it possible to reduce the load from extracting a moving object.

As previously described, the collision detection device 1 as the ECU 10 according to the exemplary embodiment uses the camera sensor 21 and the radar sensor 22 as the object detection sensors so as to improve the moving object recognition accuracy. However, the concept of the disclosure is not limited by the exemplary embodiment. It is acceptable for the collision detection device 1 as the ECU 10 according to the exemplary embodiment to use one of the camera sensor 21 and the radar sensor 22.

Further, it is possible for the collision detection device 1 as the ECU 10 according to the exemplary embodiment to detect a building, a street tree, etc. as obstacle bodies which become obstacles for the driver of the own vehicle 41 to correctly detect the presence of a pedestrian and a bicycle.

When a plurality of feature points are extracted from the farthest-located obstacle object in a plurality of detected obstacle objects when viewed from the own vehicle 41, it is preferable for the ECU 10 to determine the end point (which corresponds to the far-end part) of the high-risk region on the basis of the farthest feature point in the feature points extracted from the farthest-located obstacle object when viewed from the own vehicle 41. Similarly, when there is one detected obstacle object, it is preferable for the ECU 10 to determine the end point (which corresponds to the far-end part) of the high-risk region on the basis of the farthest feature point in the feature points extracted from the detected obstacle object when viewed from the own vehicle 41.

Further, it is acceptable for the ECU 10 as the collision detection device 1 according to the exemplary embodiment to perform the steps and the various routines only when the detection result of the collision detection routine (shown in FIG. 4, see step S103 shown in FIG. 3) indicates that the own vehicle 41 will collide with the detected moving object. Further, it is acceptable for the ECU 10 to perform each of the steps in the operation determination routine (see FIG. 5) when the detection result of the collision detection routine (shown in FIG. 4, see step S103 shown in FIG. 3) indicates that the own vehicle 41 does not collide with the detected moving object.

(Other Modifications)

A description will be given of the collision detection device 1 as the ECU 10 according to first to third modifications of the exemplary embodiment with reference to FIG. 6, FIG. 7 and FIG. 8.

In a modification of the collision detection device 1 as the ECU 10, it is acceptable to determine the high-risk region within a predetermined range determined by a distance measured from the position of the own vehicle 41 in the forward moving direction of the own vehicle 41.

The collision detection device 1 as the ECU 10 according to the first modification of the exemplary embodiment will be explained.

Figure 6:
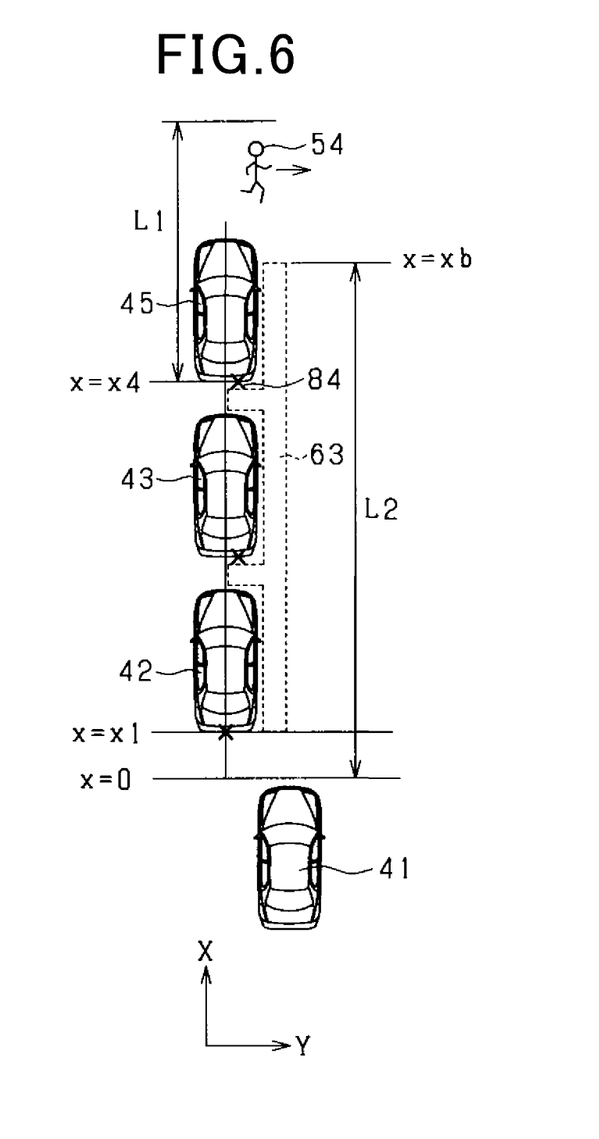
FIG. 6 is a bird's eye view showing a high-risk region determined by the collision detection device according to a first modification of the exemplary embodiment of the disclosure.

FIG. 6 is a bird's eye view showing a high-risk region determined by the collision detection device 1 as the ECU 30 according to a first modification of the exemplary embodiment of the disclosure. As shown in FIG. 6, it is acceptable for the ECU 10 to determine the farthest end point (x=xb) of the high-risk region 63 when the position which is separated from the farthest point (x=x4, as the feature point 84) of the farthest-located obstacle object (stopped vehicle 45) by the longitudinal distance L1 is deeper than the range having the end point (x=xb) measured from the own vehicle 41 by another longitudinal distance L2, where the farthest-located obstacle object 45 is located at the farthest position in the three stopped vehicles 42, 43, 45 detected on the shoulder of the road in the forward moving direction of the own vehicle 41).

The ECU 10 determines the longitudinal distance L2 so as for the longitudinal distance L2 to be adequately separated from the position of the own vehicle 41 so as to prevent the own vehicle 41 from colliding with the moving object 54 behind the farthest-located stopped vehicle 45.

Because the ECU 10 determines the end point of the high-risk region 63 on the basis of the longitudinal distance L2 when a plurality of vehicles are stopped on the shoulder of the road in the forward moving direction (i.e. the positive direction of the x axis) of the own vehicle 41, it is possible to reduce the processing load of the ECU 10 and suppress occurrence of incorrect operation of control-target devices 30 such as the warning device 31 and the brake device 32, etc.

A description will be given of the collision detection device 1 as the ECU 10 according to a second modification of the exemplary embodiment with reference to FIG. 7.

It is acceptable for the ECU 10 to eliminate, from the high-risk region, the area which is not behind the detected obstacle object when viewed from the own vehicle 41.

Figure 7:
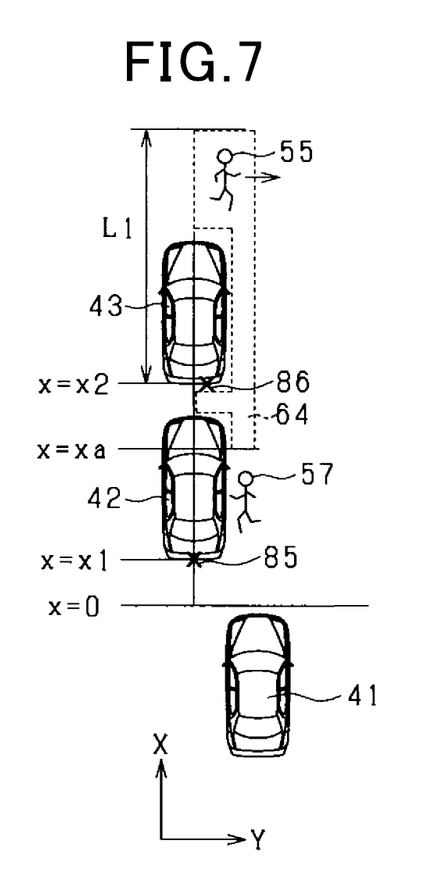
FIG. 7 is a bird's eye view showing a high-risk region determined by the collision detection device according to a second modification of the exemplary embodiment of the disclosure.

FIG. 7 is a bird's eye view showing a high-risk region determined by the collision detection device 1 as the ECU 30 according to the second modification of the exemplary embodiment. For example, as shown in FIG. 7, it is acceptable for the ECU 10 to determine, as the start point of the high-risk region 64, the feature point 86 (x=x2) of the farthest-located stopped vehicle (as the obstacle object) instead of using the feature point 85 (x=x1) of the stopped vehicle 42 which is closest to the own vehicle 41. In this case, it is acceptable for the ECU 10 to determine, as the end point of the high-risk region 64, the position which is separated from the feature point 86 of the farthest-located stopped vehicle 43 by the longitudinal distance L1.

Although the moving object 55 is detected within the high-risk region 64, but a pedestrian 57 who is standing near the stopped vehicle 42 is detected outside of the high-risk region 64. It is considered that there is a high probability of the pedestrian 57 standing near the stopped vehicle 42 not moving toward the right side on the road but instead entering the inside of the stopped vehicle 42. That is, there is a low probability of the pedestrian 57 crossing the road in front of the own vehicle 41. Because there is a low risk of the pedestrian 57 crossing the road, it is not necessary for the ECU 10 to perform the collision detection within a short time period, i.e. within a reduced collision detection time period. Accordingly, it is possible for the ECU 10 to move, i.e. offset the start point of the high-risk region 64 toward a farthest point so as to suppress the collision detection time period from being reduced.

Similarly, it is acceptable for the ECU 10 to eliminate the predetermined range from the high-risk region 64, where the predetermined range has a distance from the start point x1 to the point x1 in the forward-moving direction of the own vehicle 41. That is, when there are a plurality of stopped vehicle in the forward-moving direction of the own vehicle 41, it is acceptable for the ECU 10 to eliminate the predetermined area around the door of each of the stopped vehicles from the high-risk region on the basis of a predetermined feature point of each of the stopped vehicles as detected obstacle objects.

A description will be given of the collision detection device 1 as the ECU 10 according to a third modification of the exemplary embodiment with reference to FIG. 8.

Figure 8:
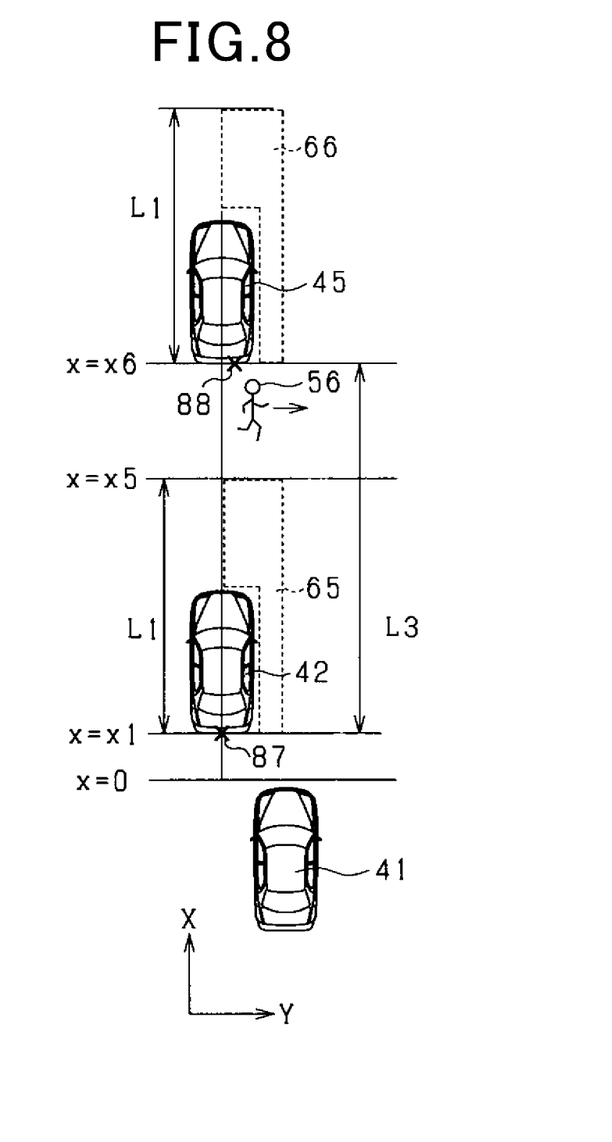
FIG. 8 is a bird's eye view showing high-risk regions determined by the collision detection device according to a third modification of the exemplary embodiment of the disclosure.

FIG. 8 is a bird's eye view showing high-risk regions determined by the collision detection device 1 as the ECU 30 according to the third modification of the exemplary embodiment. As shown in FIG. 8, when there are two obstacle objects 42 and 45, and the stopped vehicle 42 as the rear-side obstacle object is arranged between the own vehicle 41 and the stopped vehicle 45 as the far-end obstacle object, and the far-end stopped vehicle 45 is arranged at a position which is not less than a predetermined distance L3 in the forward-moving direction of the own vehicle, it is acceptable for the ECU 10 to eliminate an area between the stopped vehicles 42 and 45 from the high-risk region. In the third modification shown in FIG. 8, the high-risk region 65 is formed at the right-hand side of the rear-side stopped vehicle 42 and the high-risk region 66 is formed at the right-hand side of the far-end stopped vehicle 45 in the forward moving direction of the own vehicle 41, and the area having the range of x5 to x6 (x=x5 to x6) is determined between the far-end high-risk region 66 and the rear-side high-risk region 65, and the area having the range of x5 to x6 is eliminated from the high-risk regions 65 and 66.

As shown in FIG. 8, the high-risk region 65 has the start point and the end point. The start point of the high-risk region 65 corresponds to the feature point 87 (x=x1) of the stopped vehicle 42 located closest to the own vehicle 41 side. The end point (x=x5) of the high-risk region 65 is separated from the feature point 85 by the longitudinal distance L1. On the other hand, the high-risk region 66 has the start point and the end point. The start point of the high-risk region 66 corresponds to the feature point 88 (x=x6) of the stopped vehicle 45 located at the farthest side when viewed from the own vehicle 41. The end point of the high-risk region 66 is separated from the feature point 88 by the longitudinal distance L1. The ECU 10 adjusts the longitudinal distance L1 according to the position which is behind the stopped vehicle as the detected obstacle object. In the case shown in FIG. 8, the moving object 56 detected at the position x within the range of x5 to x6 is not behind the stopped vehicle 42. That is, it is possible for the object detection sensor such as the camera sensor 21 and the radar sensor 22 to easily detect and it is possible for the driver of the own vehicle 41 to easily recognize the presence of the moving object 56 such as a pedestrian who intends to be crossing the road. Accordingly, it is necessary for the ECU 10 to perform the collision detection of the moving object 56 within a short period of time because it is possible to easily and clearly detect the presence of the moving object 56. Because the ECU 10 generates a non-high-risk region between the high-risk region 65 (which corresponds to the stopped vehicle 42) and the high-risk region 66 (which corresponds to the stopped vehicle 45), it is possible to suppress the collision detection time period from increasing unnecessarily in spite of detecting a moving object (as the pedestrian 56, see FIG. 8) which is an object with no collision risk, i.e. which is not to be notified to the driver of the own vehicle.

While specific embodiments of the disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the disclosure which is to be given the full breadth of the following claims and all equivalents thereof.

What is claimed is:

1. A collision detection device capable of detecting a probability of whether an own vehicle will collide with a moving object detected by a detection sensor mounted on the own vehicle, the collision detection device comprising a computer system including a central processing unit, the computer system being configured to provide:
   an area determination part determining a high-risk region measured by a predetermined distance in a forward moving direction of the own vehicle from a farthest feature point in feature points obtained from obstacle objects detected on one of shoulders of a road on which the own vehicle drives, the farthest feature point being located farthest from the own vehicle in the forward moving direction of the own vehicle; and
   a collision detection part reducing a collision detection time period to be used until a finish of detecting whether the own vehicle would collide with a moving object in response to the moving object being detected in the high-risk region, the reduced collision detection time period being shorter than a collision detection time period to be used for a case in which the moving object is detected outside of the high-risk region.

2. The collision detection device according to claim 1, wherein the area determination part determines an obstacle object detection area in which the detection sensor detects the obstacle objects located on the one of shoulders of the road in the forward moving direction of the own vehicle,
   the area determination part determines the high-risk region on the basis of the farthest feature point of the obstacle objects when one obstacle object is detected in the obstacle object detection area, and
   the area determination part determines the high-risk region on the basis of the farthest feature point, which is separated from a position of the own vehicle, when a plurality of obstacle objects are detected in the obstacle object detection area.

3. The collision detection device according to claim 2, wherein the area determination part determines the high-risk region when a number of received detection signals generated by and transmitted from the detection sensor become not less than a predetermined threshold value.

4. The collision detection device according to claim 3, wherein the detection sensor comprises a plurality of object detection sensors, and the area determination part determines the high-risk region only when received detection signals representing detection of the obstacle objects are received from at least two sensors in the plurality of object detection sensors.

5. The collision detection device according to claim 2, wherein the detection sensor comprises a plurality of object detection sensors, and the area determination part determines the high-risk region only when received detection signals representing detection of the obstacle objects are received from at least two sensors in the plurality of object detection sensors.

6. The collision detection device according to claim 1, wherein the area determination part determines the high-risk region when a number of received detection signals generated by and transmitted from the detection sensor become not less than a predetermined threshold value.

7. The collision detection device according to claim 6, wherein the detection sensor comprises a plurality of object detection sensors, and the area determination part determines the high-risk region only when received detection signals representing detection of the obstacle objects are received from at least two sensors in the plurality of object detection sensors.

8. The collision detection device according to claim 1, wherein the detection sensor comprises a plurality of object detection sensors, and the area determination part determines the high-risk region only when received detection signals representing detection of the obstacle objects are received from at least two sensors in the plurality of object detection sensors.

9. A computer-implemented method of detecting a probability of whether an own vehicle will collide with a moving object detected by a detection sensor mounted on the own vehicle, the computer-implemented method comprising:
   determining a high-risk region measured by a predetermined distance in a forward moving direction of the own vehicle from a farthest feature point in feature points obtained from obstacle objects detected on one of shoulders of a road on which the own vehicle drives, the farthest feature point being located farthest from the own vehicle in the forward moving direction of the own vehicle; and
   reducing a collision detection time period to be used until a finish of detecting whether the own vehicle would collide with a moving object in response to the moving object being detected in the high-risk region, the reduced collision detection time period being shorter than a collision detection time period to be used for a case in which the moving object is detected outside of the high-risk region.

10. The computer-implemented method according to claim 9, further comprising:
    determining an obstacle object detection area in which the detection sensor detects the obstacle objects located on the one of shoulders of the road in the forward moving direction of the own vehicle,
    determining the high-risk region on the basis of the farthest feature point of the obstacle objects in response to one obstacle object being detected in the obstacle object detection area, and
    determining the high-risk region on the basis of the farthest feature point, which is separated from a position of the own vehicle, in response to a plurality of obstacle objects being detected in the obstacle object detection area.

11. The computer-implemented method according to claim 10, further comprising:
   determining the high-risk region in response to a number of received detection signals generated by and transmitted from the detection sensor becoming not less than a predetermined threshold value.

12. The computer-implemented method according to claim 11, wherein the detection sensor comprises a plurality of object detection sensors, and
   the computer-implemented method further comprising:
      determining the high-risk region only in response to received detection signals representing detection of the obstacle objects being received from at least two sensors in the plurality of object detection sensors.

13. The computer-implemented method according to claim 10, wherein the detection sensor comprises a plurality of object detection sensors, and
   the computer-implemented method further comprising:
      determining the high-risk region only in response to received detection signals representing detection of the obstacle objects being received from at least two sensors in the plurality of object detection sensors.

14. The computer-implemented method according to claim 9, further comprising:
   determining the high-risk region in response to a number of received detection signals generated by and transmitted from the detection sensor becoming not less than a predetermined threshold value.

15. The computer-implemented method according to claim 14, wherein the detection sensor comprises a plurality of object detection sensors, and
   the computer-implemented method further comprising:
      determining the high-risk region only in response to received detection signals representing detection of the obstacle objects being received from at least two sensors in the plurality of object detection sensors.

16. The computer-implemented method according to claim 9, wherein the detection sensor comprises a plurality of object detection sensors, and
   the computer-implemented method further comprising:
      determining the high-risk region only in response to received detection signals representing detection of the obstacle objects being received from at least two sensors in the plurality of object detection sensors.

* * * * *